(12) United States Patent
Weaver

(10) Patent No.: US 12,644,426 B2
(45) Date of Patent: Jun. 2, 2026

(54) TURBOPROP WITH A VARIABLE AREA NOZZLE EJECTOR

(71) Applicant: Pratt & Whitney Canada Corp., Longueuil (CA)

(72) Inventor: Paul Weaver, Chateauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/789,938

(22) Filed: Jul. 31, 2024

(65) Prior Publication Data

US 2026/0036101 A1 Feb. 5, 2026

(51) Int. Cl.
*F02K 1/12* (2006.01)
*F02K 1/00* (2006.01)
*F02K 1/36* (2006.01)
*F02K 1/38* (2006.01)

(52) U.S. Cl.
CPC ................ *F02K 1/38* (2013.01); *F02K 1/006* (2013.01); *F02K 1/1207* (2013.01); *F02K 1/36* (2013.01)

(58) Field of Classification Search
CPC ................................... F02K 1/36; F02K 1/006
See application file for complete search history.

(56) References Cited

U.S. PATENT DOCUMENTS

| | | | | |
|---|---|---|---|---|
| 2,928,238 A | * | 3/1960 | Hawkins, Jr. ............. | B64C 9/38 |
| | | | | 239/536 |
| 2,964,264 A | * | 12/1960 | Multhopp ............. | B64C 23/005 |
| | | | | 244/12.4 |

| | | | | |
|---|---|---|---|---|
| 3,615,052 A | | 10/1971 | Tumavicus | |
| 3,820,626 A | * | 6/1974 | Bonneaud et al. ....... | F02K 1/34 |
| | | | | 181/219 |
| 3,837,579 A | * | 9/1974 | Camboulives ............ | F02K 1/40 |
| | | | | 239/265.39 |
| 3,926,389 A | * | 12/1975 | Mederer ................... | B64C 5/04 |
| | | | | 244/76 R |
| 4,361,281 A | * | 11/1982 | Nash ...................... | B64D 33/04 |
| | | | | 239/265.37 |

(Continued)

FOREIGN PATENT DOCUMENTS

| | | |
|---|---|---|
| EP | 0512663 A1 | 11/1992 |
| EP | 3336340 A1 | 6/2018 |

(Continued)

OTHER PUBLICATIONS

Lancaster, O. 1959. 1. Introduction—10. Installation. Jet Propulsion Engines. Princeton: Princeton University Press, pp. 199-267. https://doi.org/10.1515/9781400877911-014 (Year: 1959).*

(Continued)

*Primary Examiner* — Devon C Kramer
*Assistant Examiner* — Marc Amar
(74) *Attorney, Agent, or Firm* — CANTOR COLBURN LLP

(57) ABSTRACT

An exhaust assembly for a turboprop engine, the assembly having: a primary exhaust nozzle disposed at an aft end of an engine core of the turboprop engine; a secondary exhaust nozzle extending aft from the primary exhaust nozzle to an aft end of the secondary exhaust nozzle, a movable panel disposed in the aft end of the secondary exhaust nozzle and movable to decrease an area of the secondary exhaust nozzle.

10 Claims, 7 Drawing Sheets

(56) References Cited

U.S. PATENT DOCUMENTS

| | | | | | |
|---|---|---|---|---|---|
| 4,375,276 | A | * | 3/1983 | Konarski | F02K 1/625 |
| | | | | | 239/265.29 |
| 4,575,099 | A | | 3/1986 | Nash | |
| 4,690,329 | A | * | 9/1987 | Madden | F02K 1/62 |
| | | | | | 239/265.19 |
| 4,753,392 | A | * | 6/1988 | Thayer | F02K 1/60 |
| | | | | | 239/265.29 |
| 5,016,818 | A | * | 5/1991 | Nash | F02K 1/1223 |
| | | | | | 239/265.19 |
| 5,050,803 | A | * | 9/1991 | Wakeman | F02K 1/006 |
| | | | | | 239/265.19 |
| D350,722 | S | * | 9/1994 | Figueroa | D12/345 |
| 5,687,907 | A | * | 11/1997 | Holden | B64C 15/02 |
| | | | | | 60/230 |
| 5,699,662 | A | * | 12/1997 | Born | B64D 33/04 |
| | | | | | 60/770 |
| 5,833,139 | A | * | 11/1998 | Sondee | B64C 15/02 |
| | | | | | 239/265.17 |
| 7,967,219 | B1 | | 6/2011 | Taylor | |
| 9,239,029 | B2 | * | 1/2016 | Herrmann | F02K 1/827 |
| 2003/0159430 | A1 | * | 8/2003 | Lair | F02K 1/15 |
| | | | | | 60/228 |
| 2009/0217643 | A1 | * | 9/2009 | Sokhey | F02K 1/46 |
| | | | | | 60/262 |
| 2018/0080410 | A1 | * | 3/2018 | Pesyna | F02K 1/12 |
| 2019/0168861 | A1 | * | 6/2019 | Fotouhie | B64C 15/12 |
| 2023/0085244 | A1 | * | 3/2023 | Miller | B64D 33/02 |
| | | | | | 415/68 |
| 2024/0140611 | A1 | * | 5/2024 | Boyer | F02K 1/825 |

FOREIGN PATENT DOCUMENTS

| | | | |
|---|---|---|---|
| EP | 4209418 | A2 | 7/2023 |
| EP | 4242444 | A1 | 9/2023 |
| EP | 4242445 | A1 | 9/2023 |
| RU | 2686574 | C1 | 4/2019 |
| WO | 2022148942 | A1 | 7/2022 |

OTHER PUBLICATIONS

Aircraft Engine Exhaust Systems with Turbocharger, [online], retreived on Jan. 9, 2026, retreived from: https://web.archive.org/web/20240616084342/https://www.aircraftsystemstech.com/p/exhaust-system-with-turbocharger.html, p. 2 (see middle portion). (Year: 2024).*

Search Report issued in European Patent Application No. 25193285.1; Date of Mailing Dec. 4, 2025 (10 pages).

* cited by examiner

TURBOPROP WITH A VARIABLE AREA NOZZLE EJECTOR

BACKGROUND

Exemplary embodiments of the present disclosure pertain to the art of turboprops and more specifically to a turboprop with a variable area nozzle ejector.

With a typical flow through turboprop engine, exhaust exits through a primary nozzle and then an ejector or secondary nozzle. The ejector is used to ventilate the exhaust out of the nacelle. The ejector may have a fixed structure with a constant exhaust area. The sizing of the exhaust area may be designed for optimum performance for one flight segment, such as cruise or take off, but may be suboptimal for the other flight segment.

BRIEF DESCRIPTION

Disclosed is an exhaust assembly for a turboprop engine, the assembly including: a primary exhaust nozzle disposed at an aft end of an engine core of the turboprop engine; a secondary exhaust nozzle extending aft from the primary exhaust nozzle to an aft end of the secondary exhaust nozzle, a movable panel disposed in the aft end of the secondary exhaust nozzle and movable to decrease an area of the secondary exhaust nozzle.

In addition to one or more of the above disclosed aspects of the assembly or as an alternate, the movable panel includes a flat surface acting on flow through the secondary exhaust nozzle when the turboprop engine is operating while the movable panel is decreasing the area of the secondary exhaust nozzle; and the movable panel extends from a forward end of the movable panel to an aft end of the movable panel, and wherein the aft end of the movable panel is pivotably connected to the secondary exhaust nozzle; the movable panel is movable hydraulically or by a first motor.

In addition to one or more of the above disclosed aspects of the assembly or as an alternate: the aft end of the secondary exhaust nozzle defines planar sidewalls extending from a top of the secondary exhaust nozzle to a bottom of the secondary exhaust nozzle, a top portion of the aft end of the secondary exhaust nozzle defines a top cutout sized to receive the movable panel, and the movable panel is positioned within the top cutout and extends between the top of the planar sidewalls.

In addition to one or more of the above disclosed aspects of the assembly or as an alternate, an arcuate bottom portion extends between the bottom of the planar sidewalls to define a U-shaped cross section.

In addition to one or more of the above disclosed aspects of the assembly or as an alternate, the movable panel is a top movable panel; the secondary exhaust nozzle defines a rectangular cross section; a bottom portion of the aft end of the secondary exhaust nozzle defines a bottom cutout; and a bottom movable panel is positioned in the bottom cutout, wherein the bottom movable panel is movable hydraulically or via a second motor.

In addition to one or more of the above disclosed aspects of the assembly or as an alternate, the bottom movable panel extends from a forward end of the bottom movable panel to an aft end of the bottom movable panel, and wherein the aft end of the bottom movable panel is pivotably connected to the secondary exhaust nozzle.

In addition to one or more of the above disclosed aspects of the assembly or as an alternate, the forward end of the top and bottom movable panels are aligned with each other along the cross section of the secondary exhaust nozzle.

In addition to one or more of the above disclosed aspects of the assembly or as an alternate, the bottom movable panel is shorter than the top movable panel, so that the aft end of the secondary exhaust nozzle defines a tapered shape.

In addition to one or more of the above disclosed aspects of the assembly or as an alternate, the planar sidewalls define a trapezoidal shape, thereby defining the tapered shape the aft end of the secondary exhaust nozzle.

In addition to one or more of the above disclosed aspects of the assembly or as an alternate, the top and bottom movable panels are configured to be in configurations including: both panels being angled toward each other to define a minimum exhaust area; or the top movable panel being angled toward the bottom movable panel, and the bottom movable panel being flush with the bottom of the planar sidewalls, to thereby define a downward airflow vector; or the bottom movable panel being angled toward the top movable panel, and the top movable panel being flush with the top of the planar sidewalls, to thereby define an upward airflow vector; or the top movable panel being flush with the top of the planar sidewalls, and the bottom movable panel being flush with the bottom of the planar sidewalls, to thereby define a maximum exhaust area.

Disclosed is a turboprop engine, including: an engine core having an aft end; a primary exhaust nozzle connected to the aft end of the engine core; a secondary exhaust nozzle extending aft from the primary exhaust nozzle to an aft end of the secondary exhaust nozzle, a movable panel disposed in the aft end of the secondary exhaust nozzle, configured to decrease an area of the secondary exhaust nozzle.

In addition to one or more of the above disclosed aspects of the engine or as an alternate, the movable panel is a flat plate, and wherein the movable panel extends from a forward end of the movable panel to an aft end of the movable panel, and wherein the aft end of the movable panel is pivotably connected to the secondary exhaust nozzle.

In addition to one or more of the above disclosed aspects of the engine or as an alternate, the aft end of the secondary exhaust nozzle defines planar sidewalls extending from a top of the planar sidewalls to a bottom of the planar sidewalls, wherein a top portion of the aft end of the secondary exhaust nozzle defines a top cutout sized to receive the movable panel, and the movable panel is positioned within the top cutout and extends between the top of the planar sidewalls.

In addition to one or more of the above disclosed aspects of the engine or as an alternate, an arcuate bottom portion extends between the bottom of the planar sidewalls to define a U-shaped cross section.

In addition to one or more of the above disclosed aspects of the engine or as an alternate, the movable panel is a top movable panel; the secondary exhaust nozzle defines a rectangular cross section; a bottom portion of the aft end of the secondary exhaust nozzle defines a bottom cutout; and a bottom movable panel is positioned in the bottom cutout.

In addition to one or more of the above disclosed aspects of the engine or as an alternate, the bottom movable panel extends from a forward end of the bottom movable panel to an aft end of the bottom movable panel, and wherein the aft end of the bottom movable panel is pivotably connected to the secondary exhaust nozzle.

In addition to one or more of the above disclosed aspects of the engine or as an alternate, the forward end of the top and bottom movable panels are aligned with each other along the cross section of the secondary exhaust nozzle.

In addition to one or more of the above disclosed aspects of the engine or as an alternate, the bottom movable panel is shorter than the top movable panel, so that the aft end of the secondary exhaust nozzle defines a tapered shape.

In addition to one or more of the above disclosed aspects of the engine or as an alternate, the planar sidewalls define a trapezoidal shape, thereby defining the tapered shape the aft end of the secondary exhaust nozzle.

Disclosed is a method of controlling airflow exhausted from a turboprop engine, including: pivoting a top movable panel disposed in an aft end of a secondary exhaust nozzle toward a bottom movable panel disposed in the aft end of the secondary exhaust nozzle, between opposite planar sidewalls, and pivoting the bottom movable panel toward the top movable panel to define a minimum exhaust area; or pivoting the top movable panel toward the bottom movable panel, while the bottom movable panel is flush with a bottom of the planar sidewalls of the aft end of the secondary exhaust nozzle, to thereby define a downward airflow vector; or pivoting the bottom movable panel toward the top movable panel, while the top movable panel is flush with a top of the planar sidewalls, to thereby define an upward airflow vector; or positioning the top movable panel flush with the top of the planar sidewalls, and the bottom movable panel flush with the bottom of the planar sidewalls, to thereby define a maximum exhaust area.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
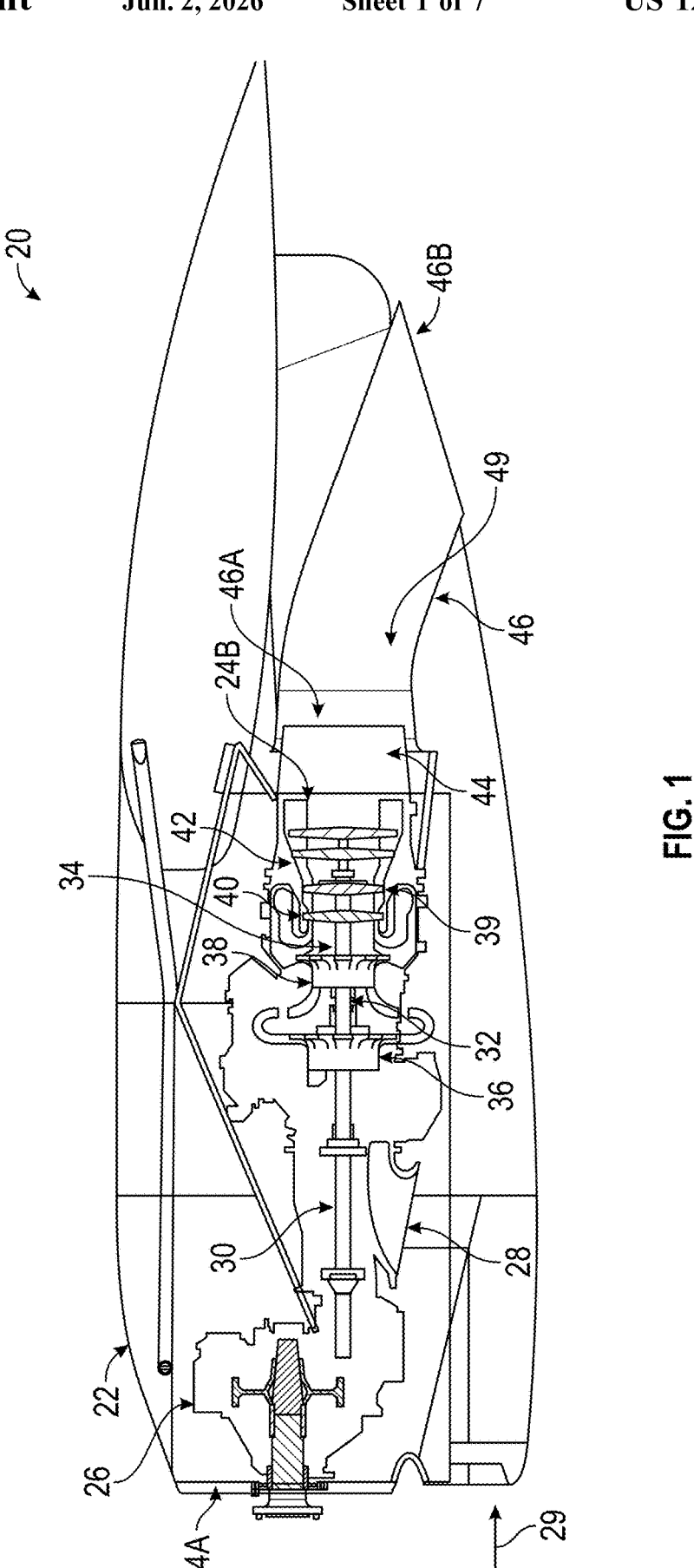
FIG. 1 is a perspective view of a turboprop according to an embodiment.

FIG. 1 schematically illustrates a turboprop engine 20. The engine 20 includes a nacelle 22. Housed within the nacelle 22 is a core 24 extending from a forward end 24A to an aft end 24B. The core 24 includes a reduction gearbox 26, an air inlet 28 that receives an airflow 29, a power turbine shaft 30, low pressure compressor shaft 32 and a high pressure compressor shaft 34. These shafts are operationally coupled to a low pressure compressor 36 and a high pressure compressor 38. The engine 20 includes a low pressure turbine 39, a high pressure turbine 40 and a power turbine 42. The aft end 24B of the core includes a primary exit exhaust nozzle 44 and an ejector 46, i.e., a secondary exhaust nozzle. The ejector 46 extends from a front end 46A to an aft end 46B. At least at the front end 46A, a cross section 49 of the ejector 46 is circular.

Figure 2:
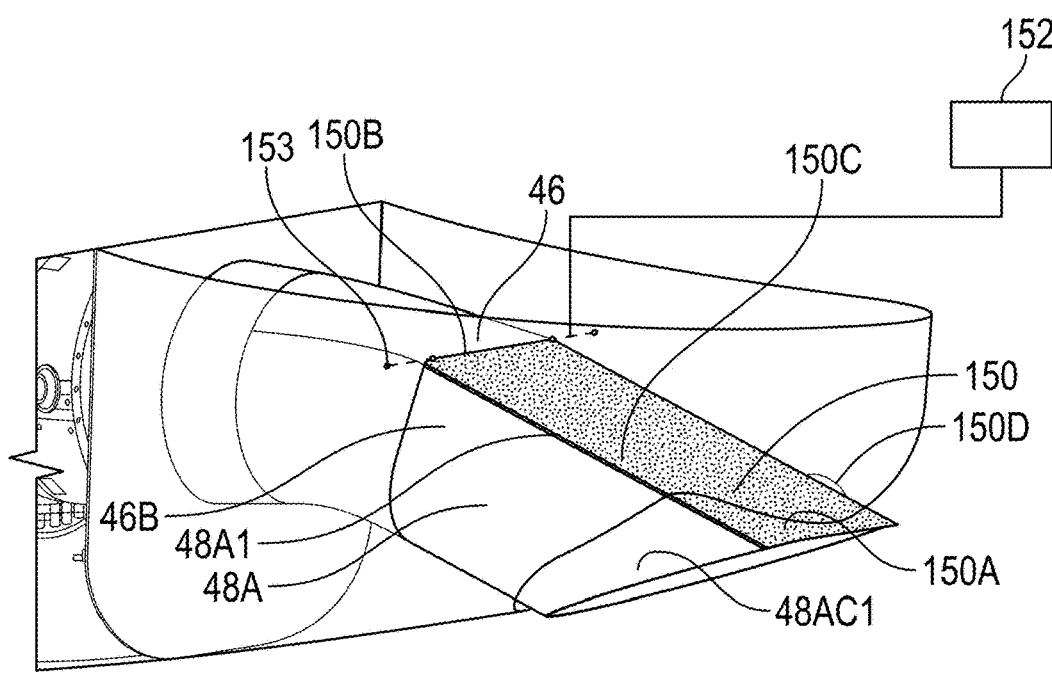
FIG. 2 is a rear perspective view of an aft end of a secondary nozzle with a movable panel according to an embodiment.

Turning to FIGS. 2, a movable panel (or door) 150 is disposed in the aft end 46B of the secondary exhaust nozzle 46. The movable panel 150 is configured to decrease an exhaust area 51 of the secondary exhaust nozzle 46. The movable panel 150 may be hydraulically actuated or actuated by a first motor 152 to pivot about a hinge line 153. In one embodiment, the movable panel 150 is a flat plate, i.e., a flat surface acting on flow through the secondary exhaust nozzle when the turboprop engine is operating while the movable panel is decreasing the area of the secondary exhaust nozzle. The movable panel 150 extends from a forward end 150A to an aft end 150B and between opposite sides 150C, 150D. The aft end 150B of the movable panel 150, as indicated, is pivotably connected to the secondary exhaust nozzle 46.

Figure 3:
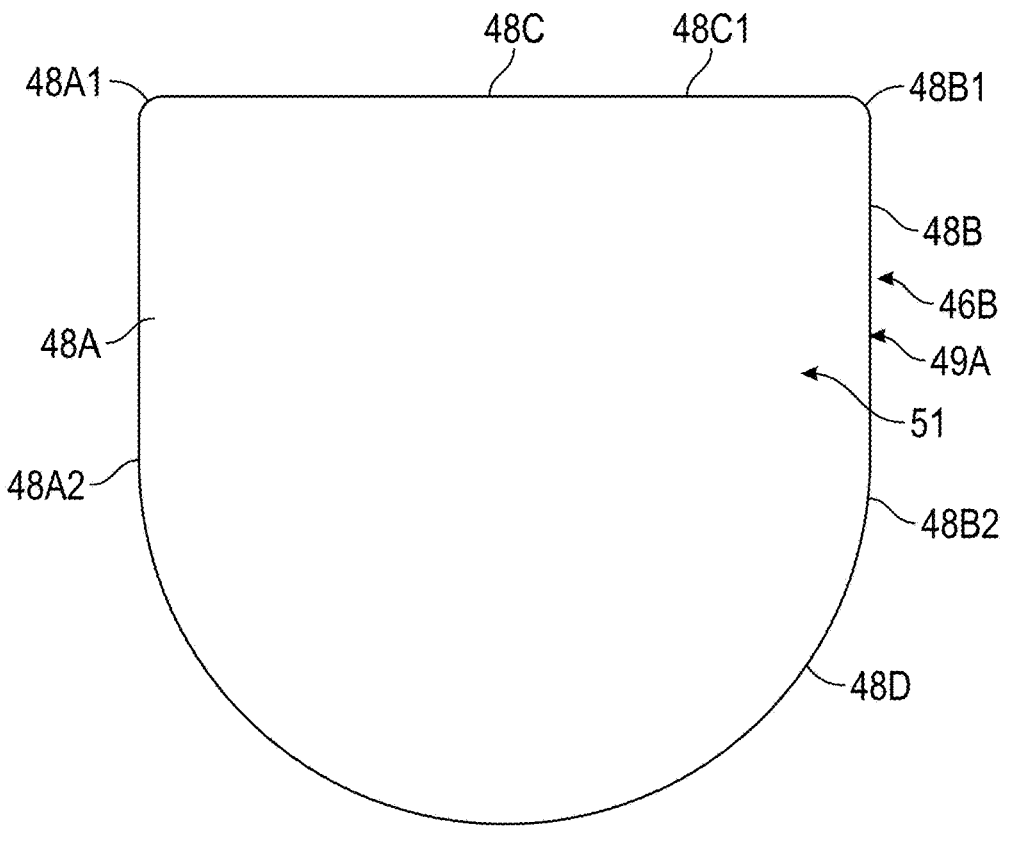
FIG. 3 is a rear view of a schematic illustration of a cross section of the aft end of a secondary nozzle.

As shown in FIG. 3, the aft end 46B of the secondary exhaust nozzle 46 defines first and second planar sidewalls 48A, 48B. The planar sidewalls 48A, 48B each extend from a respective top 48A1, 48B1 to a bottom 48A2, 48B2. A top portion 48C of the aft end 46B of the secondary exhaust nozzle 46 defines a top cutout 48C1 (FIG. 2) sized to receive the movable panel 150. As a result, the cutout 48C1 is rectangular. The movable panel 150 is positioned within the top cutout 46C1 and extends between the top 48A1, 48B1 of the planar sidewalls 48A, 48B. An arcuate bottom portion 48D of the aft end 46B of the secondary exhaust nozzle 46 extends between the bottom 48A2, 48B2 of the planar sidewalls 48A, 48B to define a U-shaped cross section 49A.

Figure 4:
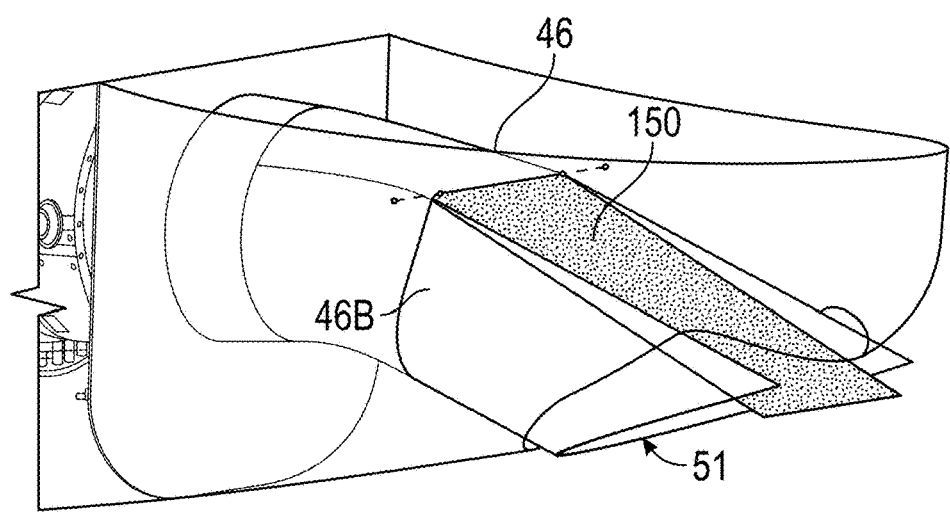
FIG. 4 is a rear perspective view of an aft end of a secondary nozzle with the movable panel pitched down.
Figure 5:
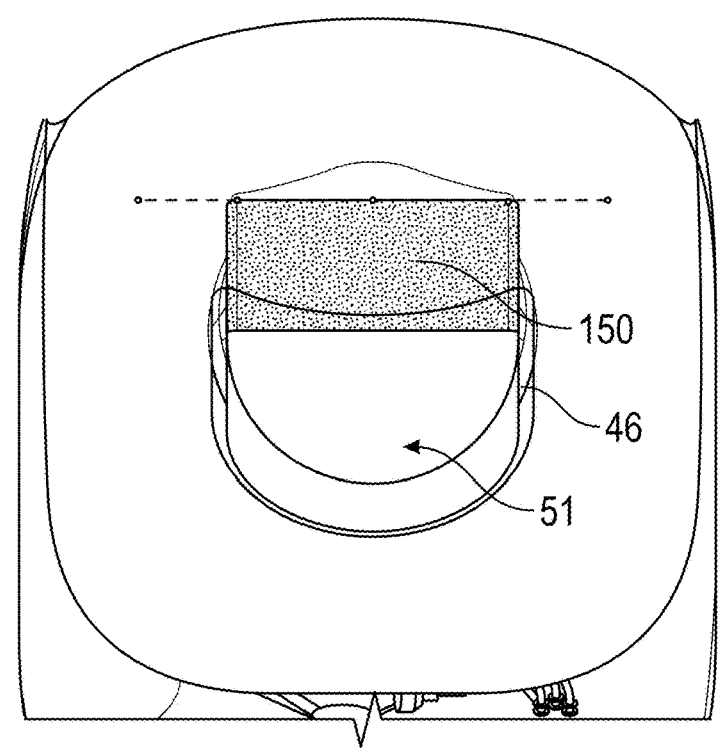
FIG. 5 is a rear view of the aft end of a secondary nozzle with the movable panel pitched down.

As shown in FIGS. 4 and 5, the movable panel 150 may be pivoted downward, toward the bottom portion 48D. This decreases the flow area 51 defined by the U-shaped cross section 49A.

Figure 6:
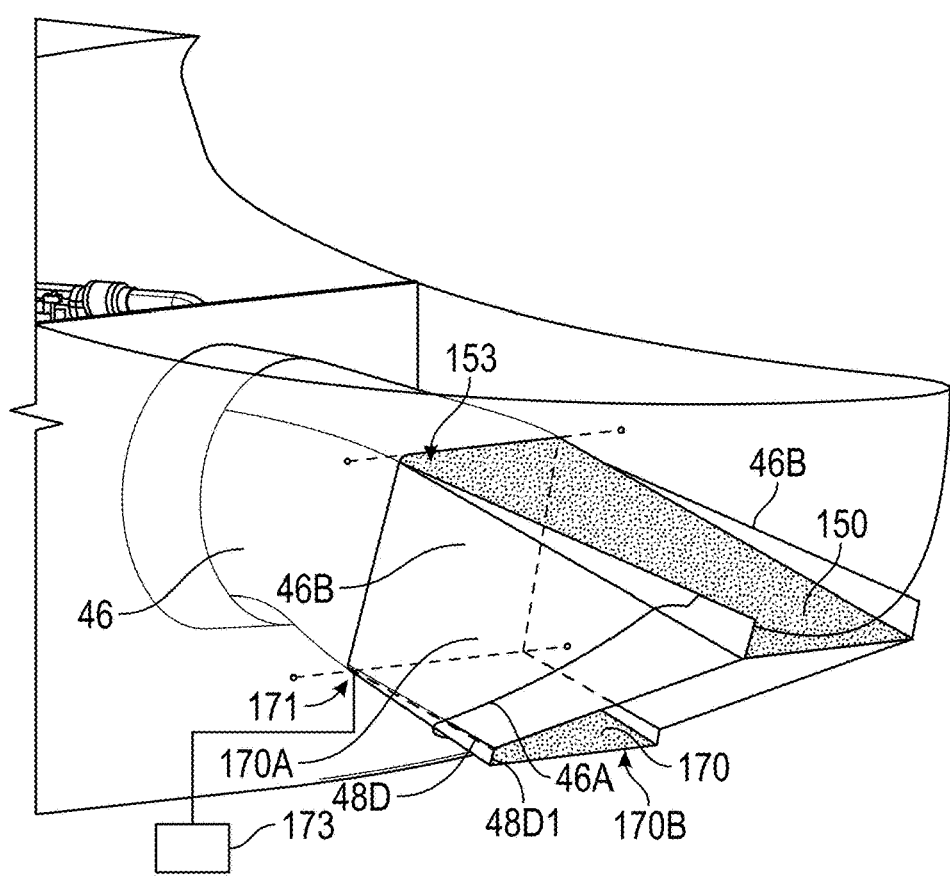
FIG. 6 is a rear perspective view of an aft end of a secondary nozzle with top and bottom movable panels according to an embodiment.

Turning to FIG. 6, the movable panel 150 is a top (or first) movable panel 150. A bottom portion 48D of the aft end 46B of the secondary exhaust nozzle 46 defines a bottom cutout 48D1. A bottom (or second) movable panel 170 is positioned in the bottom cutout 48D1. The bottom movable panel 170 extends from a forward end 170A to an aft end 170B. The aft end 170B of the bottom movable panel 170 is pivotably connected to the secondary exhaust nozzle 46 about a second hinge line 171, which is parallel to the hinge line 153, which may be considered a first hinge line. The bottom movable panel 170 is also a flat plate, i.e., a flat surface acting on flow through the secondary exhaust nozzle when the turboprop engine is operating while the bottom movable panel is decreasing the area of the secondary exhaust nozzle. The bottom movable panel 170 may be hydraulically actuated or actuated by a second motor 173 to pivot about the second hinge line 171. The bottom movable panel 170 is shorter than the top movable panel 150. With this configuration, the aft end 46B of the secondary exhaust nozzle 46 defines a tapered shape. That is, the planar sidewalls 48A, 48B define a trapezoidal shape, from which the tapered shape the aft end of the secondary exhaust nozzle 46 is defined.

Figure 7:
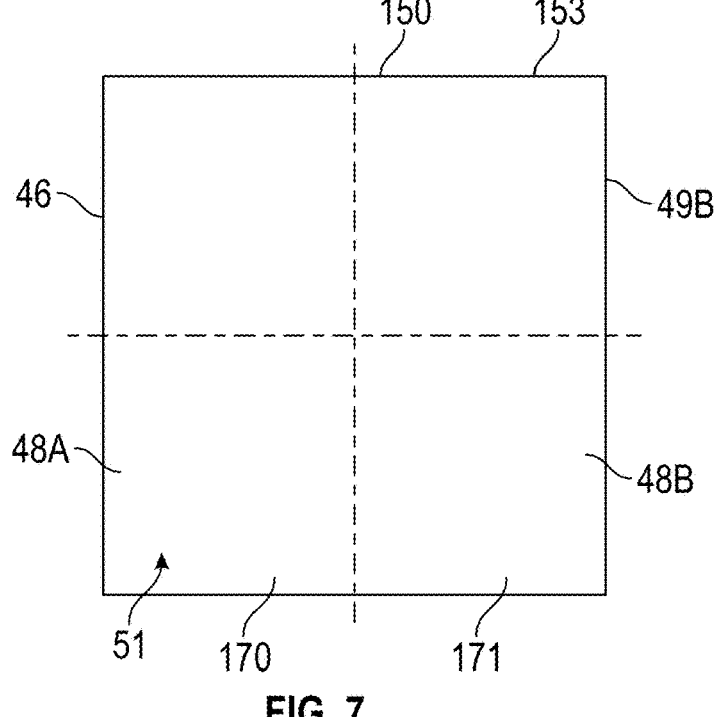
FIG. 7 is a rear view of a schematic illustration of a cross section of the aft end of a secondary nozzle of FIG. 6.

As shown in FIG. 7, between the top and bottom movable panels 150, 170 and the opposite sidewalls 48A, 48B, the secondary exhaust nozzle 46 defines a rectangular cross section 49B and corresponding exhaust area 51. The forward ends of 150A, 170A, the top and bottom movable panels 150, 170 are aligned with each other along the cross section 49B of the secondary exhaust nozzle 46. With this configuration, the straight sidewalls 48A, 48B, provide for the relatively easy travel and sealing of the top and bottom movable panels 150, 170, where the sealing is, e.g. along the hinge lines 153, 171.

Figure 8:
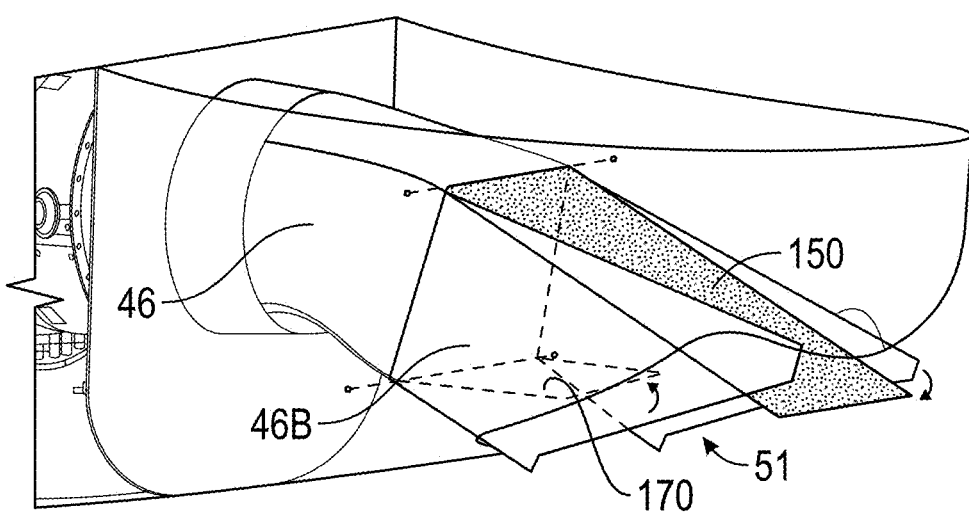
FIG. 8 is a rear perspective view of an aft end of a secondary nozzle with top and bottom movable panels, where the top and bottom panels are pitched toward each other.

Turing to FIG. 8, the top and bottom movable panels 150, 170 are configured to be in a first configuration. In this configuration, both panels 150, 170 angled toward each other. This configuration results in a minimum exhaust area 51.

Figure 9:
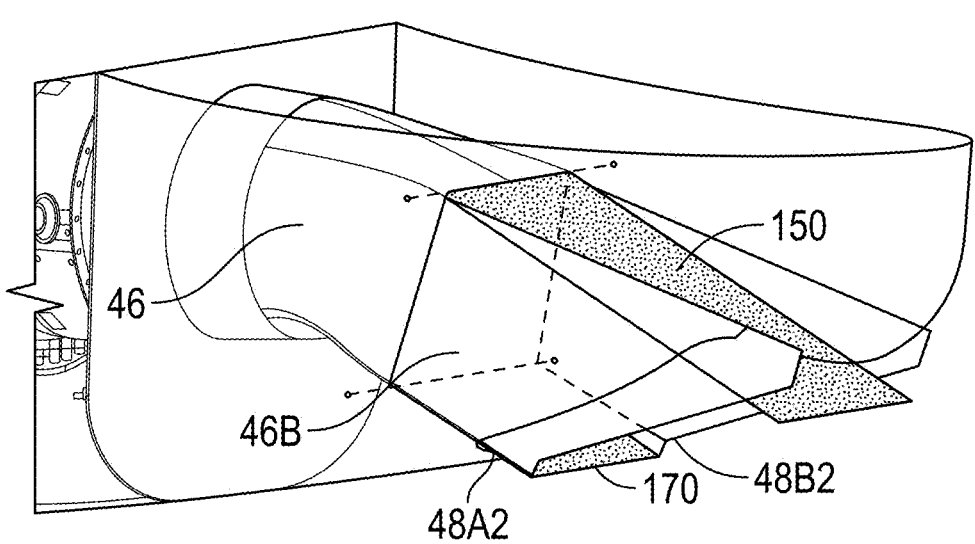
FIG. 9 is a rear perspective view of an aft end of a secondary nozzle with top and bottom movable panels, where the top panel is pitched toward the bottom panel.

Turing to FIG. 9, the top and bottom movable panels 150, 170 are configured to be in a second configuration. In this configuration, the top movable panel 150 is angled toward the bottom movable panel 170, and the bottom movable panel 170 is flush with the bottoms 48A2, 48B2 of the planar sidewalls 48A, 48B. This configuration results in a downward airflow vector.

Figure 10:
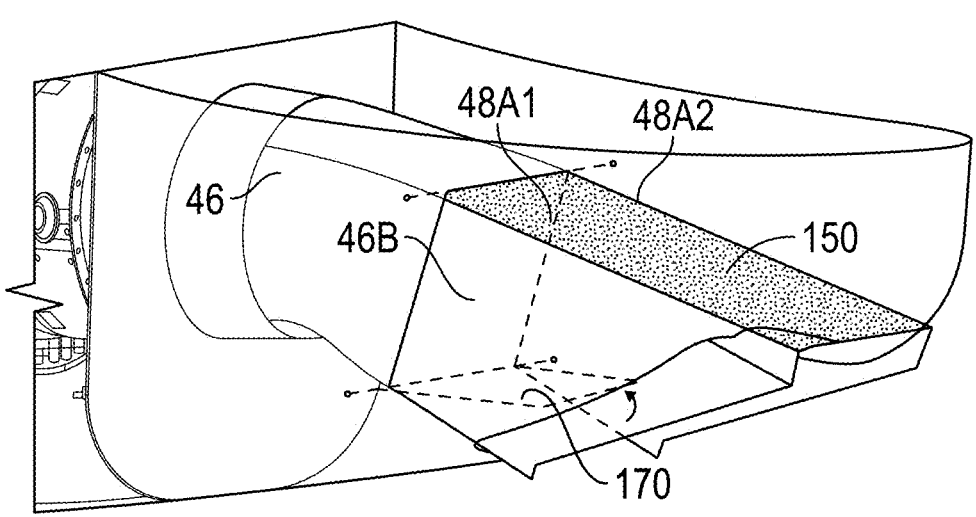
FIG. 10 is a rear perspective view of an aft end of a secondary nozzle with top and bottom movable panels, where the bottom panel is pitched toward the top panel.

Turing to FIG. 10, the top and bottom movable panels 150, 170 are configured to be in a third configuration. In this configuration, the bottom movable panel 170 is angled toward the top movable panel 150, and the top movable panel 150 is flush with the tops 48A1, 48B1 of the planar sidewalls 48. This configuration defines an upward airflow vector.

Figure 11:
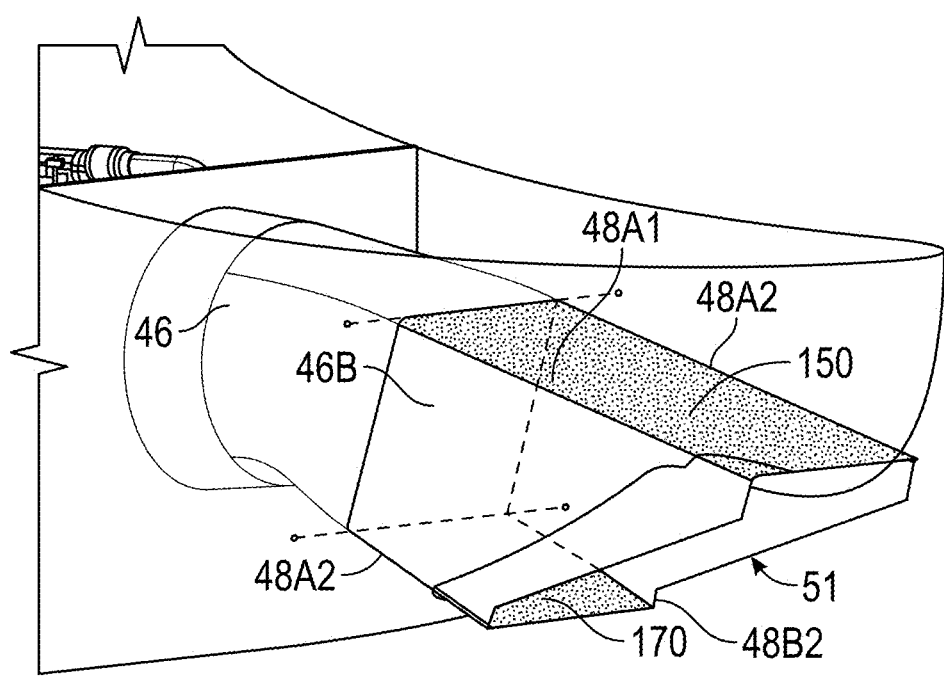
FIG. 11 is a rear perspective view of an aft end of a secondary nozzle with top and bottom movable panels, neither panel is pitched toward the other panel.

Turing to FIG. 11, the top and bottom movable panels 150, 170 are configured to be in a fourth configuration. In this configuration, the top movable panel 150 is flush with the top 48A1, 48B1, of the planar sidewalls 48A, 48B, and the bottom movable panel 170 is flush with the bottom 48A2, 48B2, of the planar sidewalls 48A, 48B. This configuration provides a maximum exhaust area 51.

Figure 12:
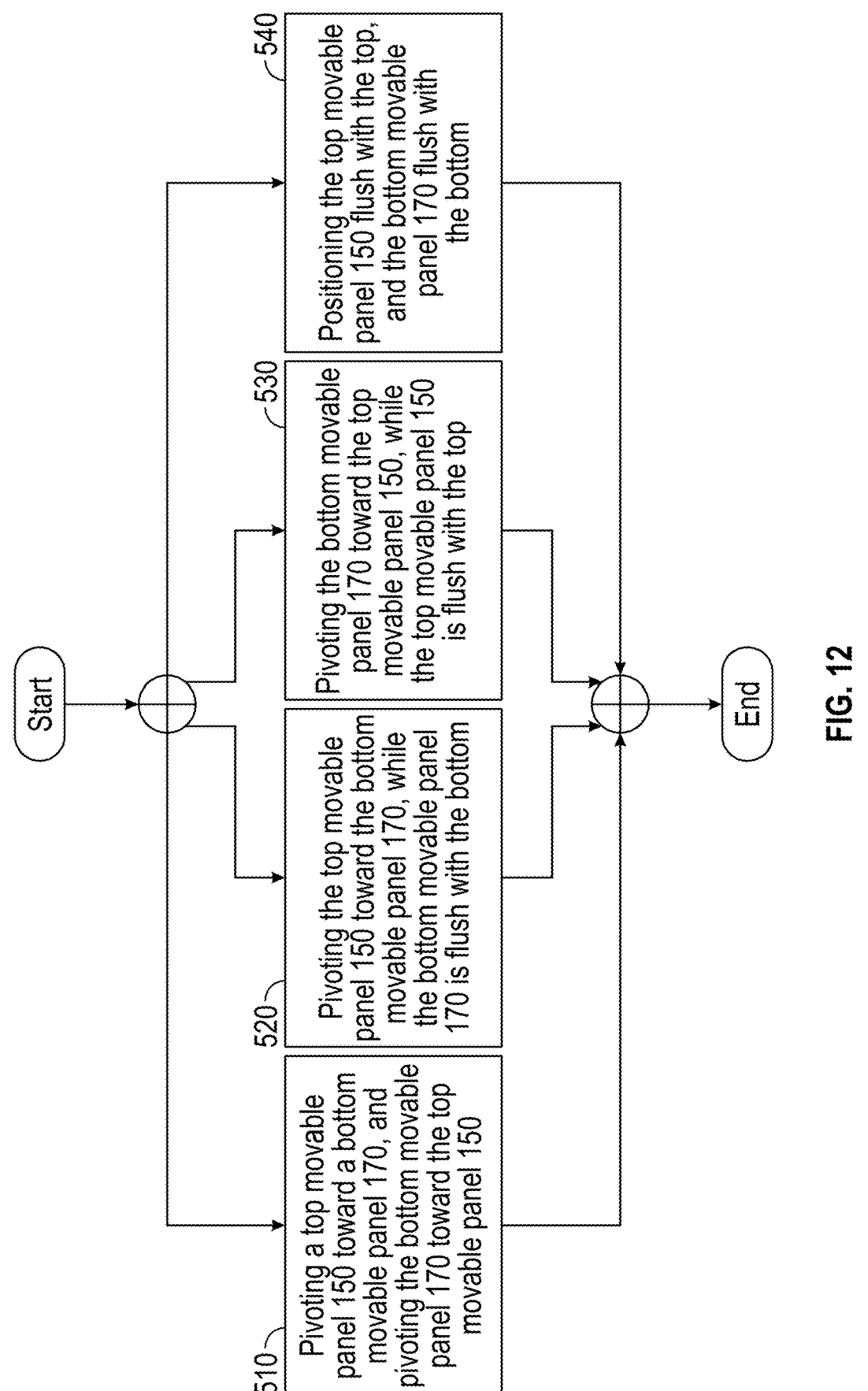
FIG. 12 is a flowchart showing a method of controlling airflow exhausted from a turboprop engine.

Turning to FIG. 12, a flowchart shows a method of controlling airflow exhausted from a turboprop engine 110. As shown in block 510, the method includes pivoting a top movable panel 150 disposed in an aft end 46B of a secondary exhaust nozzle 46, between the opposite planar sidewalls 48A, 48B, toward a bottom movable panel 170, and pivoting the bottom movable panel 170 toward the top movable panel 150. This configuration results in a minimum exhaust area 51.

As shown in block 520, the method alternatively includes pivoting the top movable panel 150 toward the bottom movable panel 170, while the bottom movable panel 170 is flush with the bottoms 48A2, 48B2 of the planar sidewalls 48A, 48B of the aft end 46B of a secondary exhaust nozzle 46. This configuration results in a downward airflow vector.

As shown in block 530, the method alternatively includes pivoting the bottom movable panel 170 toward the top movable panel 150, while the top movable panel 150 is flush with the tops 48A1, 48B1 of the planar sidewalls 48A. 48B. This configuration results in an upward airflow vector.

As shown in block 540, the method alternatively includes positioning the top movable panel 150 flush with the tops 48A1, 48B1 of the planar sidewalls 48A, 48B, and the bottom movable panel 170 flush with the bottoms 48A2, 48B2 of the planar sidewalls 48A, 48B. This configuration results in a maximum exhaust area 51.

The variable nozzle of the disclosed embodiments enables an optimal engine efficiency at all stages of flight. With a squared ejector at the location of movable panel, a simple geometrical configuration that is relatively easy to maneuver is cable of providing the desired control of the exhaust area.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An exhaust assembly of a turboprop engine, the exhaust assembly comprising:

a primary exhaust nozzle disposed at an aft end of an engine core of the turboprop engine;

a secondary exhaust nozzle extending aft from the primary exhaust nozzle to an aft end of the secondary exhaust nozzle, a movable panel disposed in the aft end of the secondary exhaust nozzle and movable to decrease an area of the secondary exhaust nozzle;

the movable panel is a flat plate acting on flow through the secondary exhaust nozzle when the turboprop engine is operating while the movable panel is decreasing the area of the secondary exhaust nozzle; and the movable panel extends from one end of the movable panel to another end of the movable panel, and wherein the another end of the movable panel is pivotably connected to the secondary exhaust nozzle;

the movable panel is movable hydraulically or by a first motor;

the aft end of the secondary exhaust nozzle defines planar sidewalls extending from a top of the secondary exhaust nozzle to a bottom of the secondary exhaust nozzle, a top portion of the aft end of the secondary exhaust nozzle defines a top cutout sized to receive the movable panel, and the movable panel is positioned within the top cutout and extends between the top of the planar sidewalls;

the movable panel is a top movable panel and the flat plate is a top flat plate;

the secondary exhaust nozzle defines a rectangular cross section;

a bottom portion of the aft end of the secondary exhaust nozzle defines a bottom cutout; and a bottom movable panel that is a bottom flat plate that is positioned in the bottom cutout, wherein the bottom movable panel is movable hydraulically or via a second motor, the bottom movable panel extends from one end of the bottom movable panel to another end of the bottom movable panel, and wherein the another end of the bottom movable panel is pivotably connected to the secondary exhaust nozzle, wherein for each of the top and bottom panels, the one end of the movable panels is closer to the aft end of the engine core than the another end of the movable panels, and the top and bottom panels define a flat shape from the one end to the another end; and wherein the top and bottom panels are capable of being pivoted such that at least one of:

the top movable panel is angled toward the bottom movable panel, and the bottom movable panel is flush with a bottom of the planar sidewalls, to thereby provide a downward airflow vector; or the bottom movable panel is angled toward the top movable panel, and the top movable panel is flush with a top of the planar sidewalls, to thereby provide an upward airflow vector.

2. The assembly of claim 1, wherein the one end of the top and bottom movable panels are aligned with each other along the cross section of the secondary exhaust nozzle.

3. The assembly of claim 2, wherein the bottom movable panel is shorter than the top movable panel, so that the aft end of the secondary exhaust nozzle defines a tapered shape.

4. The assembly of claim 3, wherein the planar sidewalls define a trapezoidal shape, thereby defining the tapered shape at the aft end of the secondary exhaust nozzle.

5. The assembly of claim 4, wherein the top and bottom movable panels are configured to be in configurations including:

both panels being angled toward each other to define a minimum exhaust area; or the top movable panel being angled toward the bottom movable panel, and the bottom movable panel being flush with the bottom of the planar sidewalls, to thereby define a downward airflow vector; or the bottom movable panel being angled toward the top movable panel, and the top movable panel being flush with the top of the planar sidewalls, to thereby define an upward airflow vector; or the top movable panel being flush with the top of the planar sidewalls, and the bottom movable panel being flush with the bottom of the planar sidewalls, to thereby define a maximum exhaust area.

6. A turboprop engine comprising, comprising:

a nacelle;

an engine core disposed within the nacelle and having an aft end; and the exhaust assembly of claim 1 disposed within the nacelle and connected to the aft end of the engine core.

7. The engine of claim 6, wherein the one end of the top and bottom movable panels are aligned with each other along the cross section of the secondary exhaust nozzle.

8. The engine of claim 7, wherein the bottom movable panel is shorter than the top movable panel, so that the aft end of the secondary exhaust nozzle defines a tapered shape.

9. The engine of claim 8, wherein the planar sidewalls define a trapezoidal shape, thereby defining the tapered shape at the aft end of the secondary exhaust nozzle.

10. A method of controlling airflow exhausted from the turboprop engine of claim 6, comprising:

pivoting the top movable panel disposed in the aft end of the secondary exhaust nozzle toward the bottom movable panel disposed in the aft end of the secondary exhaust nozzle, between the planar sidewalls, and pivoting the bottom movable panel toward the top movable panel to define a minimum exhaust area; or pivoting the top movable panel toward the bottom movable panel, while the bottom movable panel is flush with the bottom of the planar sidewalls of the aft end of the secondary exhaust nozzle, to thereby define the downward airflow vector; or pivoting the bottom movable panel toward the top movable panel, while the top movable panel is flush with the top of the planar sidewalls, to thereby define the upward airflow vector; or positioning the top movable panel flush a top of the planar sidewalls, and the bottom movable panel flush with the bottom of the planar sidewalls, to thereby define a maximum exhaust area.

* * * * *